A. W. McWILLIAMS.
AUTOMOBILE LOCKING DEVICE.
APPLICATION FILED JULY 9, 1917.
1,406,670. Patented Feb. 14, 1922.
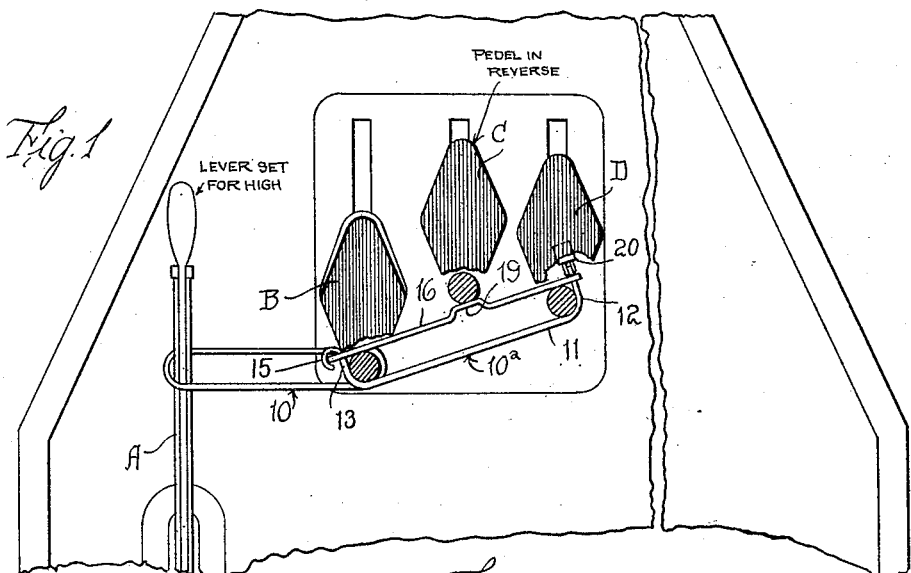
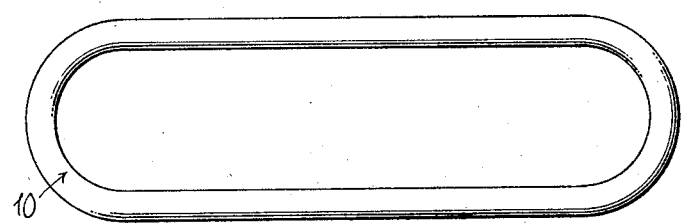
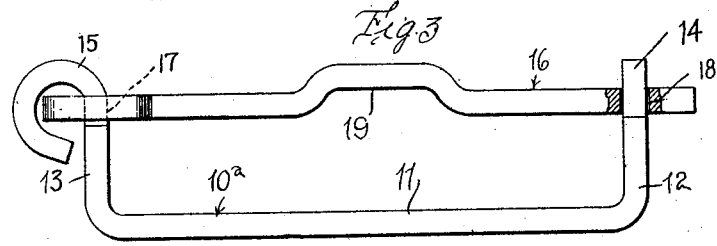
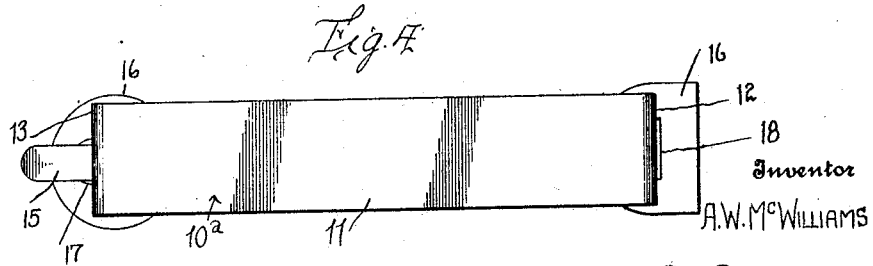
Inventor
A. W. McWILLIAMS
By Watson E. Coleman
Attorney

UNITED STATES PATENT OFFICE.

ANDERSON W. McWILLIAMS, OF OKLAHOMA, OKLAHOMA.

AUTOMOBILE LOCKING DEVICE.

1,406,670.  Specification of Letters Patent.  Patented Feb. 14, 1922.

Application filed July 9, 1917. Serial No. 179,530.

*To all whom it may concern:*

Be it known that I, ANDERSON W. MCWILLIAMS, a citizen of the United States, residing at Oklahoma city, in the county of Oklahoma and State of Oklahoma, have invented certain new and useful Improvements in Automobile Locking Devices, of which the following is a specification, reference being had to the accompanying drawings.

This invention relates to automobile locking devices, and particularly to that class of devices which shackle the pedals or gear shifting lever of an automobile, the device being particularly adapted to a certain type of cars wherein the brake lever is the means whereby the transmission gear is shifted into high speed.

In this type of car, there is an emergency brake lever, which as before stated is shifted into one direction to put the car into high speed and there is a clutch pedal, a reverse pedal and a brake pedal, these three pedals being arranged in a row.

The general object of this invention is to provide a shackle which will engage around the emergency brake lever and the clutch pedal when the latter is in normal position and the emergency brake lever is shifted to a high speed position, which will extend in front of the reverse lever when the latter is shifted to a "reverse" position and over the brake pedal when the latter is in normal position, and which may then be locked in place against removal, thus preventing not only the starting of the car, but preventing the car from being towed for the reason that the reverse transmission gearing and the high speed transmission gearing will operate against each other.

A further object is to provide a construction of this kind in which the member which locks the reverse pedal in its reverse position is so formed as to compensate for any looseness or tightness in the reverse pedal.

A further object is to provide a device of this character which is exceedingly simple in construction, easily made and may be cheaply sold.

Other objects will appear in the course of the following description.

My invention is illustrated in the accompanying drawings, wherein:

Figure 1 is a top plan view of a portion of an automobile showing the controlling pedals and the emergency lever, the controlling pedals being partly broken away, and showing my locking device applied thereto;

Figure 2 is a plan view of the shackle 10;

Figure 3 is a plan view of the shackle 10ª;

Figure 4 is a front elevation of the shackle 10ª.

Referring to these figures, it will be seen that my locking device comprises an elongated link 10, which may be made of steel or other suitable material and which has a shorter diameter such that it may be disposed over the emergency brake lever and over the clutch pedal, and a length sufficient for that end.

Coacting with the link 10 is a shackle, designated generally 10ª and comprising an angularly bent bar 11, the ends 12 and 13 extending at an angle to the body of the bar, the extremity of the angular end 12 being reduced as at 14 and perforated for the passage of the hasp of a padlock. The opposite end 13 of this bar is reduced in thickness and then curved around as at 15 to provide for a loose or hinged connection with a bar 16, both extremities of which are perforated, the perforation 17 being for engagement with the hook 15, while the perforation 18 is for the passage of the reduced portion 14. This bar 16 at one point in its length is deflected as at 19.

In the practical use of this invention, when it is desired to lock the automobile from movement, the emergency brake lever A of the automobile is thrown into "high" position, the clutch pedal B is placed in its normal position, the reverse pedal C is thrown into its full reverse position, and the brake pedal D is left in its normal position. The link 10 is then disposed around the emergency brake lever A and the clutch pedal B. Then the shackle 10ª is disposed with the bar 11 in front of the reverse pedal back of the clutch pedal and extending through the link 10 and around the brake pedal D. Then the bar 16 is turned parallel to the bar 11 and locked by means of the padlock 20. Now it will be seen that inasmuch as the emergency brake lever A is in high and the reverse pedal C is in reverse, that the machine can neither be moved forward or backward, the reverse and high speed transmission gearing operating reversely to each other, if any attempt is made to start the car or to tow it.

It often happens that the reverse pedal is loose on its shaft and it is the purpose of the deflected portion 19 to compensate for this looseness. If the clutch pedal is loose, then the bar 16 is turned so that the deflected portion 19 will extend forward and hold the reverse pedal pushed forward to its greatest possible extent and to the full extent of the play that there may be between the reverse pedal and the shaft. If, however, the reverse pedal is tight on its shaft and there is no play, then the bar 16 is turned so that the deflected portion 19 extends rearward, as there is no necessity in that case of taking up any play.

The lock 20 may be of any suitable character. I have shown an ordinary padlock, but it will be understood that I do not wish to be limited to the details of construction shown, as these may be varied to some extent, without departing from the spirit of the invention.

Having described my invention, what I claim is:—

1. Means for locking the pedals of automobiles comprising a shackle composed of two bars, one of the bars being angularly bent at its ends, the other bar being approximately straight, the straight bar being hingedly connected to one of the angularly bent ends of the first named bar, the opposite end of the straight bar being formed with a perforation for the passage of the corresponding angular end, and means engaging this last named angular end for locking the bars to each other, the middle portion of the second named bar being outwardly deflected across its entire width to form an abutment engageable against a reversing pedal when the shackle embraces the clutch pedal and the brake pedal.

2. Means for locking the pedals of automobiles comprising a shackle composed of two bars, adapted to embrace between them a clutch pedal and a brake pedal one of said bars being formed with perforations at its ends, the middle portion of the bar being outwardly deflected to provide a concave inner surface and a convex outer surface extending transversely across the entire width of the bar and forming an abutment engageable against a reversing pedal when the shackle is in operative position, the other of the bars being angularly bent at its ends, the angular ends being reduced in width for passage through said perforations, one of said reduced portions being bent to form a hook to secure pivotal engagement between the bars, the other reduced portion being perforated and passing through the perforation in the first named bar, and a lock engaging the perforation in the reduced end of the second named bar.

In testimony whereof I hereunto affix my signature in the presence of two witnesses.

ANDERSON W. McWILLIAMS.

Witnesses:
K. L. McWILLIAMS,
L. A. JAMES.